United States Patent Office

3,636,044
Patented Jan. 18, 1972

3,636,044
N-(3',5'-DICHLOROPHENYL)ITACONIMIDE
Akira Fujinami, 134–4 Nishiyamacho, Ashiya-shi, Japan; Fukashi Horiuchi, 18–19 Tominosatocho, Takatsuki-shi, Japan; Katsuji Nodera, 28–16 Koshienguchi-3-chome, Nishinomiya-shi, Japan; Toshiaki Ozaki, 11–14 Sonehigashimachi-2-chome, and Sigeo Yamamoto, 149–24 Honmachi-9-chome, both of Toyonaka-shi, Japan; and Tadashi Ooishi, 9–17 Sakuragaoka-4-chome, Minoo-shi, Japan
No Drawing. Filed Apr. 21, 1969, Ser. No. 818,157
Int. Cl. C07d 27/10
U.S. Cl. 260—326.5
1 Claim

ABSTRACT OF THE DISCLOSURE

A novel compound, N-(3',5' - dichlorophenyl)itaconimide is less phyto-toxic as well as harmless to mammals and has a peculiarly conspicuous fungicidal activity. The novel compound can readily be prepared by dehydrating N-(3',5'-dichlorophenyl)itaconic acid monoamide. A fungicidal composition containing N-(3',5'-dichlorophenyl)itaconimide as an active ingredient have prominent preventive and exterminative effects on such fungi as *Pyricularia oryzae* Cav., *Cochliobolus miyabeanus*, *Pellicularia sasakii*, Sclerotinia, *Aspergillus niger* and the like.

BACKGROUND OF THE INVENTION

The present invention relates to a novel compound, N-(3',5'-dichlorophenyl)itaconimide and to a process for preparing the same and to a novel microbicidal composition containing the same as an active ingredient.

Chemical Abstract, 57, p. 14947; ditto, 58, p. 888; ditto, 58, p. 4431 disclose a number of N-phenylitaconimide derivatives. N-phenylitaconimide, N - (2' - chlorophenyl)itaconimide, N-(3' - chlorophenyl)itaconimide, N-(4' - chlorophenyl)itaconimide, N-(2' - nitrophenyl)-itaconimide, N - (3' - nitrophenyl)itaconimide, N-(4'-nitrophenyl)itaconimide, N-(3' - methylphenyl)itaconimide, N - (4' - methylphenyl)itaconimide, N - (2'-methoxyphenyl)itaconimide, N - (4' - methoxyphenyl)itaconimide, N-(2',5' - dimethylphenyl)itaconimide, N-(2',6' - dimethylphenyl)itaconimide, N-(2',5' - dichlorophenyl)itaconimide and N-(2 - nitro-4-methylphenyl)-itaconimide are known. However, these compounds are not so much effective as microbicides.

SUMMARY OF THE INVENTION

In accordance with the present invention, it has been found that N-(3',5' - dichlorophenyl)itaconimide is a novel compound and shows extremely high anti-microbial activity. It has also been found that its anti-microbial activity is exerted on a wide variety of phyto-pathogenic bacteria and fungi and/or parasites of industrial products and it cannot be anticipated at all from other related compounds. Particularly it has prominent fungicidal effect on *Pyricularia oryzae*, *Cochliobolus miyabeanus*, *Pellicularia sasakii* Sclerotinia, *Aspergillus niger*, of agricultural, horticultural and industrial products and the like, said fungi have given rise to critical problems in the agriculture field.

It is one of the objects of the present invention to provide N-(3',5'-dichlorophenyl)itaconimide.

It is another object of the present invention to provide a process for preparing N-(3',5'-dichlorophenyl)itaconimide.

A further object of the invention is to provide a novel fungicidal composition containing N-(3',5' - dichlorophenyl)itaconimide as an active ingredient.

Heretofore, there have not been seen at all such fungicides having a wide range of fungicidal spectra as in the present compound. The present compound does not have any injurious action on agricultural and horicultural products and does not contain such harmful metals as mercury. Thus, the present compound is extremely useful in the agricultural field.

The novel compound of the present invention can be obtained readily by dehydrating N-(3',5'-dichlorophenyl)itaconic acid monoamide. In that case, the desired compound can readily be obtained in a good yield by stirring and refluxing the starting monoamide together with an adequate dehydrating agent, for example, acetic anhydride, acetyl chloride, phosphorus pentachloride, phosphorus oxychloride or the like, preferably acetic anhydride. In that case, the refluxing time of 1 hour is sufficient therefor.

The present compound thus obtained may be used as such in the practical application without incorporating therewith any other components, or may be used in admixture with inert carrier and other ingredients.

The novel fungicidal composition of the present invention comprises effective amount of N-(3',5'-dichlorophenyl)itaconimide as an active ingredient. The present composition may be formulated into any form of composition usually used for fungicidal composition, for example, dusts, wettable powders, emulsifiable concentrates, granules, etc. Further, the present fungicidal composition may be used in admixture with other ingredients, for example, such antibiotics, organic chloride, organo phosphorus compounds, organic arsenide, organic sulfide and carbamate as Blasticidin S, Kasugamycin, O,O-diethyl-S-benzylphosphorothiolate, O - ethyl - S,S-diphenylphosphorodithiolate, pentachlorobenzaldoxim, O-butyl-S-benzyl-S-ethylphosphorothiolate, iron methylarsonate, Zineb, Maneb, N - (3,5 - dichlorophenyl)maleimide, N-(3,5 - dichlorophenyl)succinimide, O-ethyl-O-phenyl-O-(2,4,5 - trichlorophenyl)phosphate, 1 - (N-n-butylcarbamoyl) - 2 - methoxycarbonylaminobenzimidazole, BHC, Malathion, Dimethoate, EPN, NAC, Meobal (trade name of a product produced by Sumitomo Chemical Co., Ltd.) and Sumithion (registered trade name of a product produced by Sumitomo Chemical Co., Ltd.). The above referred to Blasticidin S, Kasugamycin, Zineb, Maneb, BHC, Malathion, and Dimethoate are all common names for the materials named. EPN is the common name and registered trademark of Du Pont for O-ethyl-O-p-nitrophenyl phenylphosphonothioate. NAC is carbaryl: 1-naphthyl-N-methyl carbamate. Meobal is MPMC; 3,4 - dimethylphenyl-N-methyl carbamate. Sumithion is Fenitrothion; O,O-dimethyl-O-(3 _ methyl-4-nitrophenyl) thiophosphate. Alternatively, the present fungicidal composition may be used in admixture with other agricultural chemicals such as herbicides, nematocides, miticides, or fertilizers.

DESCRIPTION OF THE PREFERRED EMBODIMENT

The following examples are given to explain the present invention more fully, but it is needless to say that the kind and mixing ratio of the additives used in the invention can be varied in a wide range without being limited only to those disclosed in these examples. Parts are by weight.

Example I

Twenty-seven point four grams of N-(3',5'-dichlorophenyl)itaconic acid monoamide, 50 g. of acetic anhydride and 1 g. of sodium acetate were charged in a 100 ml. four-necked flask and refluxed with stirring for 1 hour. Thereafter, the acetic acid and acetic anhydride were distilled off under reduced pressure, and the residue was washed with water and dried. The thus obtained crude product was recrystallized from alcohol to obtain 21.5 g. of white crystals, M.P. 142°–143° C.

*Elementary analysis.*—Calculated (percent): C, 51.59; H, 2.76; N, 5.47; Cl, 27.69. Found (percent): C, 51.53; H, 2.63; N, 5.35; Cl, 27.87.

Example II

Three parts of N-(3',5'-dichlorophenyl)itaconimide and 97 parts of clay were thoroughly pulverized and mixed together to obtain a dust containing 3% of an active ingredient.

On the occasion of its application, it is applied, as it is.

Example III

Fifty parts of N-(3',5'-dichlorophenyl)itaconimide, 5 parts of a wetting agent (alkylbenzene sulfonate type) and 45 parts of diatomaceous earth were thoroughly pulverized and mixed together to obtain a wettable powder containing 50% of an active ingredient.

On the occasion of its application, the wettable powder is applied after it is diluted with water.

Example IV

Five parts of N-(3',5'-dichlorophenyl)itaconimide, 5 parts of an emulsifier (polyoxyethylene alkylphenol ether type) and 90 parts of dimethyl sulfoxide were mixed together to obtain a 5% emulsifiable concentrate. On the occasion of its application, it is diluted with water and applied.

Example V

Preventive and exterminative effects on *Pyricularia oryzae* Cav.—Rice plants (variety: Wase Asahi), which had been cultivated in pots of 9 cm. diameter up to the 3-leaved stage, were individually sprayed with dusts to be tested in the proportion of 100 mg. per pot using a belljar duster. On the next day, the rice plants were inoculated with spores of *Pyricularia oryzae* Cav. Five days after the inoculation, the number of progressed disease spots was counted to investigate the individual fungicidal effect of each dusts tested. The results are shown in Table 1.

TABLE I

| No. | Compound | Active ingredient concentration (percent) | Number of disease spots per 10 leaves |
|---|---|---|---|
| 1 | N-(3',5'-dichlorophenyl)itaconimide | 3.0 | 5 |
| 2 | N-phenylitaconimide | 3.0 | 108 |
| 3 | N-(2'-chlorophenyl)itaconimide | 3.0 | 203 |
| 4 | N-(3'-chlorophenyl)itaconimide | 3.0 | 186 |
| 5 | N-(4'-chlorophenyl)itaconimide | 3.0 | 191 |
| 6 | N-(2'-nitrophenyl)itaconimide | 3.0 | 226 |
| 7 | N-(3'-nitrophenyl)itaconimide | 3.0 | 237 |
| 8 | N-(4'nitrophenyl)itaconimide | 3.0 | 211 |
| 9 | N-(3'-methylphenyl)itaconimide | 3.0 | 199 |
| 10 | N-(4'-methylphenyl)itaconimide | 3.0 | 214 |
| 11 | N-(2'-methoxyphenyl)itaconimide | 3.0 | 356 |
| 12 | N-(4'-methoxyphenyl)itaconimide | 3.0 | 292 |
| 13 | N-(2',5'-dimethylphenyl)itaconimide | 3.0 | 237 |
| 14 | N-(2',6'-dimethylphenyl)itaconimide | 3.0 | 209 |
| 15 | N-(2',5'-dichlorophenyl)itaconimide | 3.0 | 105 |
| 16 | N-(2'-nitro-4'methylphenyl)itaconimide | 3.0 | 256 |
| 17 | Phenylmercury acetate | 0.20 | 18 |
| 18 | Untreated | | 382 |

Example VI

Preventive and exterminative effects on *Cochliobolus miyabeanus.*—Rice plants (variety: Wase Asahi), which had been cultivated in pots of 9 cm. in diameter up to the 4-leaved stage, were individually sprayed with wettable powders diluted with water in the proportion of 7 ml. per pot. On the next day, the rice plants were spray-inoculated with spores of *Cochliobolus miyabeanus.* Four days after the inoculation, the number of progressed disease spots was counted to investigate the respective fungicidal effect of each wettable powder tested. The results were as shown in Table 2.

TABLE 2

| No. | Compound | Active ingredient concentration (p.p.m.) | Number of disease spots per leaf |
|---|---|---|---|
| 1 | N-(3'5'-dichlorophenyl)itaconimide | 500 | 0 |
| 2 | N-phenylitaconimide | 500 | 57 |
| 3 | N-(2'-chlorophenyl)itaconimide | 500 | 46 |
| 4 | N-(3'-chlorophenyl)itaconimide | 500 | 49 |
| 5 | N-(4'-chlorophenyl)itaconimide | 500 | 58 |
| 6 | N-(2'-nitrophenyl)itaconimide | 500 | 52 |
| 7 | N-(3'nitrophenyl)itaconimide | 500 | 53 |
| 8 | N-(4'-nitrophenyl)itaconimide | 500 | 60 |
| 9 | N-(3'-methylphenyl)itaconimide | 500 | 45 |
| 10 | N-(4'-methylphenyl)itaconimide | 500 | 48 |
| 11 | N-(2'-methoxyphenyl)itaconimide | 500 | 63 |
| 12 | N-(4'-methoxyphenyl)itaconimide | 500 | 59 |
| 13 | N-(2',5'-dimethylphenyl)itaconimide | 500 | 41 |
| 14 | N-(2',6'-dimethylphenyl)itaconimide | 500 | 63 |
| 15 | N-(2',5'-dichlorophenyl)itaxonimide | 500 | 52 |
| 16 | N-(2'-nitro-4'-methylphenyl)itaconimide | 500 | 61 |
| 17 | Untreated | | 87 |

Example VII

Preventive and exterminative effects on *Pellicularia sasakii.*—When rice plants (variety: Wase Asahi), which had been cultivated in polyvinyl pots having a capacity of 300 ml., grown in height of about 60 cm., the rice plants were individually sprayed with the test emulsions diluted with water in the proportion of 10 ml. per pot. On the next day, leaves and stems of the rice plants were inoculated with mycel segments of 5 mm. in diameter of *Pellicularia sasakii.* Five days after the inoculation, the leaves and stems attached with the disease were investigated. The results were as shown in Table 3.

TABLE 3

| No. | Compound | Active ingredient concentration (p.p.m.) | Disease rate of leaves and stem) (percent) |
|---|---|---|---|
| 1 | N-(3',5'-dichlorophenyl)itaconimide | 500 | 0 |
| 2 | N-phenylitaconimide | 500 | 88.3 |
| 3 | N-(2'-chlorophenyl)itaconimide | 500 | 100 |
| 4 | N-(3'-chlorophenyl)itaconimide | 500 | 100 |
| 5 | N-(4'-chlorophenyl)itaconimide | 500 | 100 |
| 6 | N-(2'-nitrophenyl)itaconimide | 500 | 100 |
| 7 | N-(3'-nitrophenyl)itaconimide | 500 | 100 |
| 8 | N-(4'-nitrophenyl)itaconimide | 500 | 100 |
| 9 | N-(3'-methylphenyl)itaconimide | 500 | 100 |
| 10 | N-(4'-methylphenyl)itaconimide | 500 | 100 |
| 11 | N-(2'-methoxyphenyl)itaconimide | 500 | 100 |
| 12 | N-(4'-methoxyphenyl)itaconimide | 500 | 100 |
| 13 | N-(2',5'-dimethylphenyl)itaconimide | 500 | 97.6 |
| 14 | N-(2',6'-dimethylphenyl)itaconimide | 500 | 93.4 |
| 15 | N-(2'-5'-dichlorophenyl)itaconimide | 500 | 89.1 |
| 16 | N-(2'-nitro-4'-methylphenyl) itaconimide | 500 | 100 |
| 17 | Untreated | | 100 |

Example VIII

N-(3',5'-dichlorophenyl)itaconimide was tested for their microbicidal effects on various microorganisms which cause serious damage to plants and industrial products, according to the agar dilution method. A solution of N-(3',5'-dichlorophenyl)itaconimide diluted with dioxane was mixed with a warm sterilized potato agar medium in a ratio of 1 ml. of the solution per 10 ml. of the agar medium. The mixture was poured into each petri-dish and allowed to solidify. Then, the suspension of the microorganism was inoculated on each medium. The concentration of the test compound in the agar medium was 1,000, 200, 40 or 8 p.p.m. The results are shown in Table 4 in term of the inhibitory concentration of the test compound.

TABLE 4

Minimum inhibitory concentration against growth of test organism at the 5th day after inoculation (p.p.m.)

| Test organism: | N-(3',5'-dichloropheny)itaconimide |
|---|---|
| *Piricularia oryzae* | 40 |
| *Cochliobolus miyabeanus* | 8 |
| *Alternaria kikuchiana* | 8 |
| *Alternaria mali* | 8 |
| *Pythium aphanidermatum* | 200 |
| *Pellicularia sasakii* | 200 |
| *Pellicularia filamentosa* | 8 |
| *Helminthosporium sigmoidium* | 40 |
| *Fusarium oxysporum* f. *niveum* | 200 |
| *Corticium rolfsii* | 200 |
| *Botrytis cinerea* | 8 |
| *Glomerella cingulata* | 8 |
| *Xanthomonas oryzae* | 40 |
| *Aspergillus niger* | 40 |
| *Sclerotinia sclerotiorum* | 8 |

As shown above, the anti-microbial activity of N-(3',5'-dichlorophenyl)itaconimide against various microbes is much higher than that of the chemical-structurally related compounds. Accordingly, they are useful for control of such plant diseases caused by phyto-pathogenic fungi and germs as rice blast, rice leaf spot, rice sheath blight, bacterial leaf blight, powdery mildew of vegetables and fruits, gray mold of strawberry, anthracnose, black spot of pear and the like, and also for reduction of damage caused by *Aspergillus niger*. Otherwise stated, they are used as active ingredients in germicidal compositions for agricultural and industrial use.

From the above Tables 1–4, it can be seen that the present N-(3',5'-dichlorophenyl)itaconimide is superior to any of known N-phenylitaconimide derivatives, and that it is no less better than phenylmercury acetate.

The invention being thus described, it will be obvious that the same may be varied in many ways. Such variations are not to be regarded as a departure from the spirit and scope of the invention, and all such modifications are intended to be included within the scope of the following claim.

We claim:
1. N-(3',5'-dichlorophenyl)itaconimide.

References Cited

UNITED STATES PATENTS 2,444,536  7/1948  Searle _____ 260—326.5
3,098,002  7/1963  Riddell et al. ____ 260—326.5 X ALEX MAZEL, Primary Examiner J. A. NARCAVAGE, Assistant Examiner U.S. Cl. X.R.

260—537 N; 424—274

UNITED STATES PATENT OFFICE
CERTIFICATE OF CORRECTION

Patent No. 3,636,044　　　　　　　　　Dated January 18, 1972

Inventor(s) Akira Fujinami et al.

It is certified that error appears in the above-identified patent and that said Letters Patent are hereby corrected as shown below:

Please insert reference to the assignee of this patent as follows:

--Sumitomo Chemical Co., Ltd., Higashi-Ku, Osaka, Japan--

Signed and sealed this 15th day of August 1972.

(SEAL)
Attest:

EDWARD M. FLETCHER, JR.
Attesting Officer

ROBERT GOTTSCHALK
Commissioner of Patents